Figure 1:
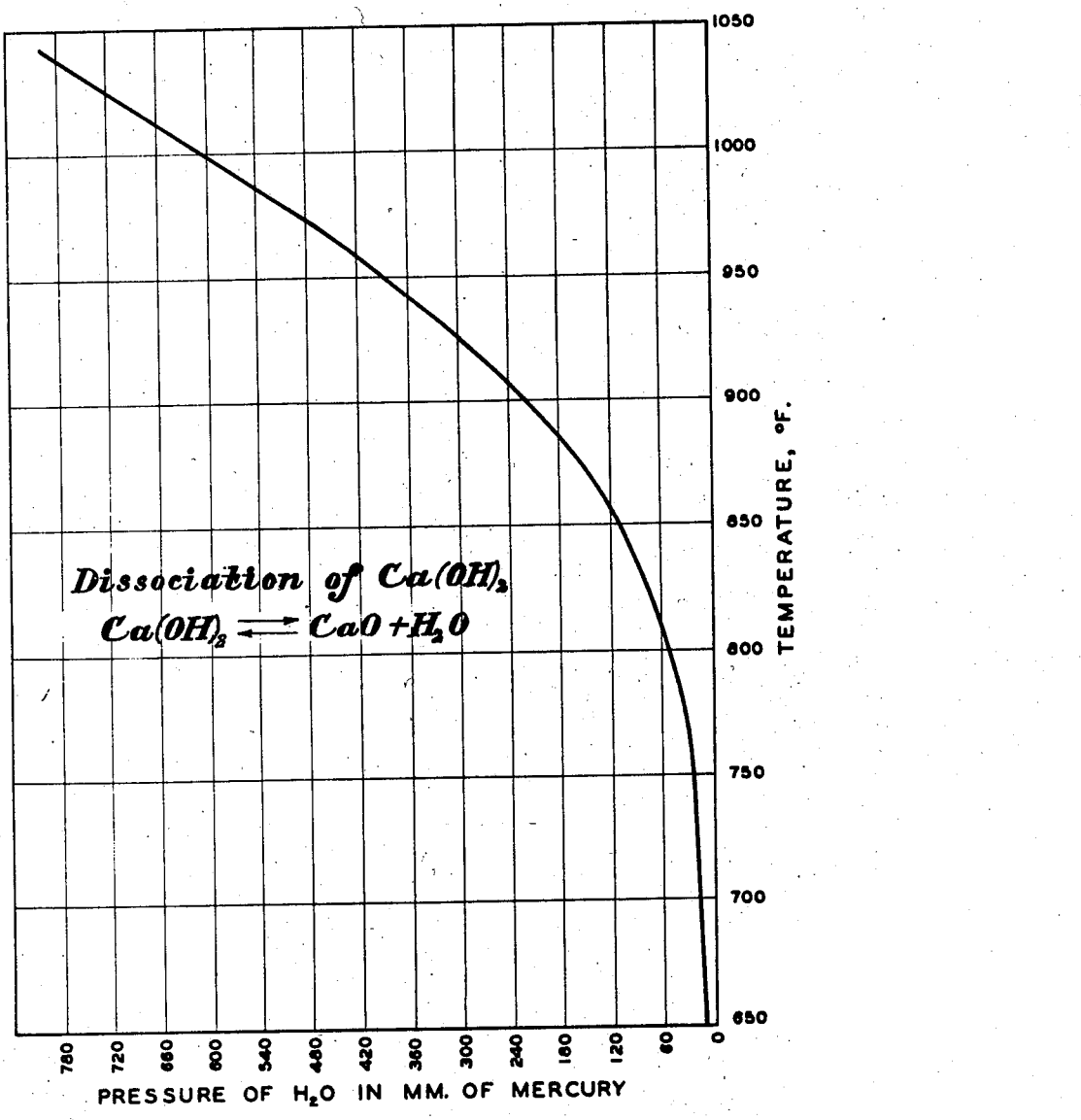
Figure 2:
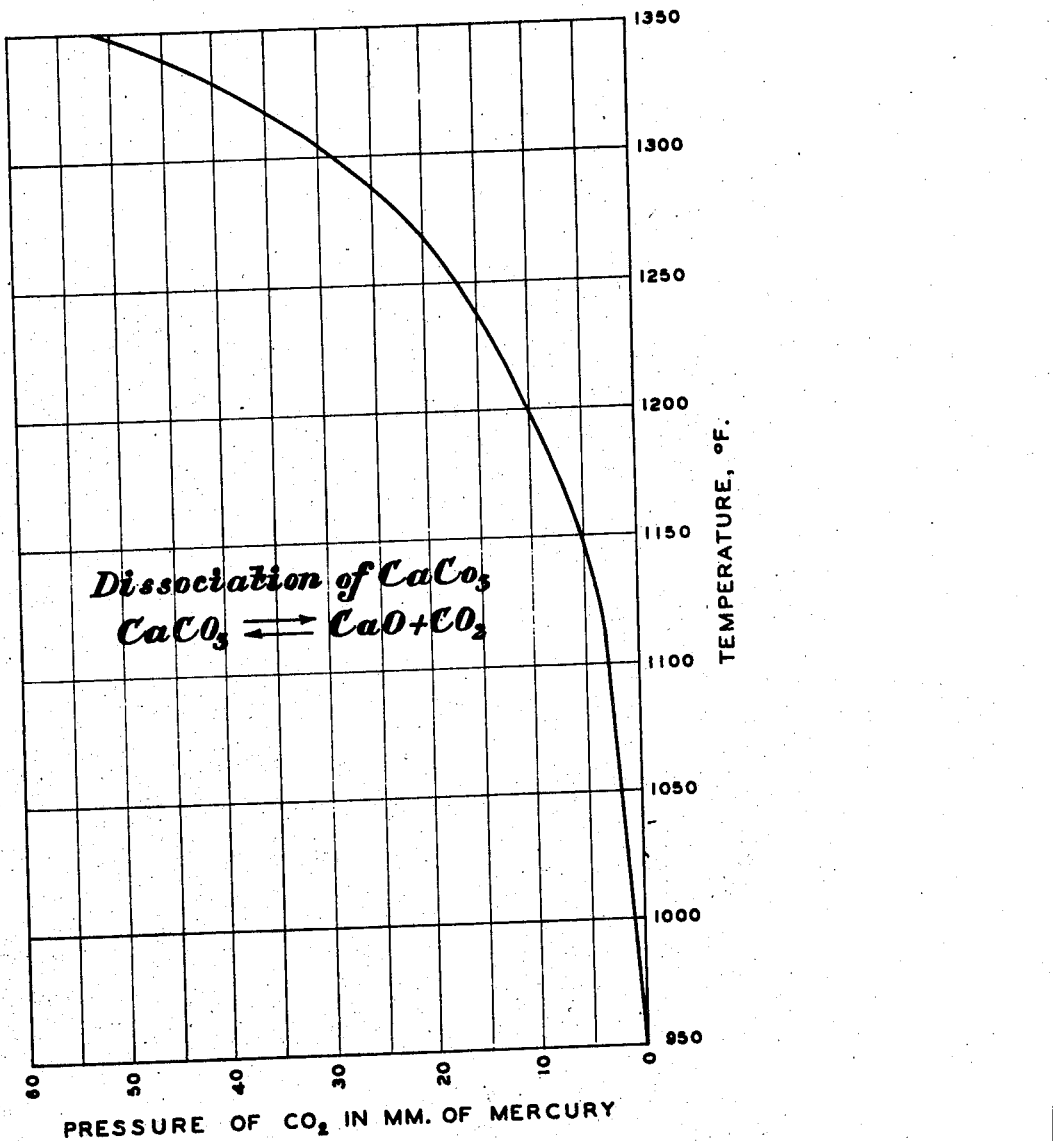
Figure 3:
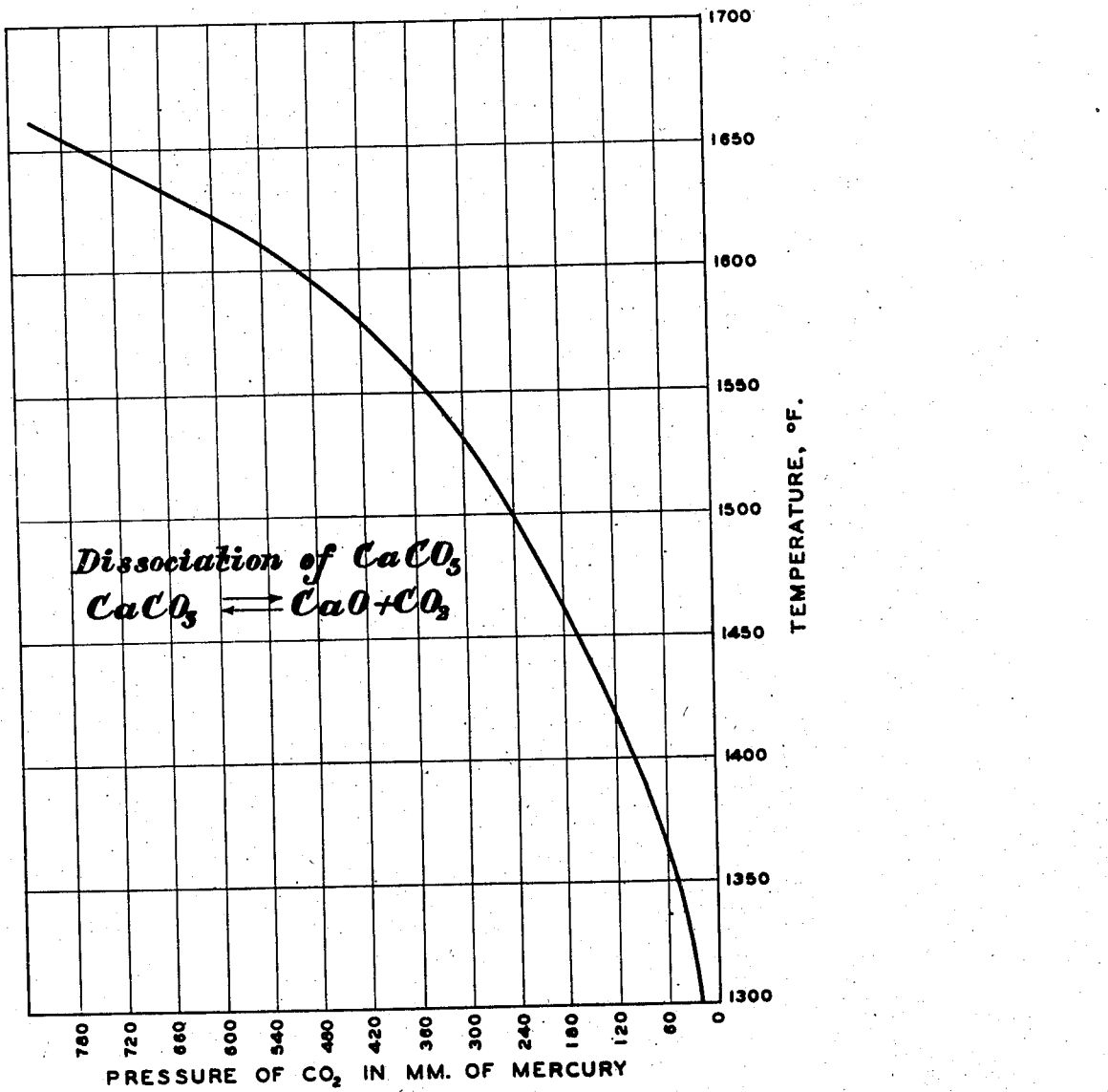

Patented Dec. 14, 1948

2,456,072

UNITED STATES PATENT OFFICE 2,456,072

CONVERSION OF HYDROCARBONS IN THE PRESENCE OF A CATALYST AND CALCIUM OXIDE TOGETHER WITH STEAM AND/OR CARBON DIOXIDE

Milton M. Marisic, Northfield, Ill., assignor to The Pure Oil Company, Chicago, Ill., a corporation of Ohio Application February 12, 1945, Serial No. 577,442

11 Claims. (Cl. 196—52)

This invention relates to endothermic catalytic reactions and more particularly to endothermic catalytic hydrocarbon conversion reactions such as cracking, dehydrogenation, hydroforming, desulfurization and reforming.

In catalytic conversion reactions in which the reactants undergo endothermic conversion, difficulty is experienced in maintaining the catalyst at the desired reaction temperature. In some types of catalytic conversions such as static bed conversions of which the Houdry cracking process is an example, heat exchangers are provided through which a heating medium such as molten salt is passed in order to keep the catalyst at the required temperature.

I have discovered that the temperature of the catalyst can be maintained at the desired level by carrying out the reaction in the presence of substances which undergo an exothermic reaction during the conversion stage without adversely affecting the conversion reaction and which can be readily reconverted to the active stage during the regeneration cycle. As an example of such substances, quicklime or calcium oxide and carbon dioxide, and/or water may be mentioned. In the presence of steam or water, quicklime becomes hydrated to calcium hydroxide giving off a large amount of heat. During regeneration of the catalyst, calcium hydroxide is converted to calcium carbonate by reaction with the carbon dioxide formed by the burning of the coke deposited on the catalyst. Toward the end of the regeneration cycle when the partial pressure of carbon dioxide in the regenerative gas is low, the calcium carbonate is decomposed to calcium oxide.

An object of the invention is to provide a method of maintaining desired catalyst temperature in endothermic catalytic chemical conversion processes.

Another object of the invention is to provide a method for maintaining the temperature of a cracking catalyst during cracking of hydrocarbon oil vapors.

A further object of the invention is to provide a method of regulating temperature of catalyst during on stream and regeneration cycles in which exothermic heat is provided by means of chemical reaction during the on stream cycle and the reaction product is capable of being endothermally reconverted to the active stage during the regeneration cycle.

Other objects of the invention will become manifest from the following description and the accompanying drawings of which Figure I is a graph showing the dissociation curve for calcium hydroxide;

Figure II is a graph showing the dissociation curve for calcium carbonate over the temperature range of 950 to 1350° F. and over a carbon dioxide pressure range of 0–51.5 mm. of mercury;

Figure III is a graph showing the dissociation curve for calcium carbonate over the temperature range of 1300 to 1650° F. and over a carbon dioxide pressure range of 18–816 mm. of mercury.

Referring to the drawings, the curve in Figure I represents conditions at which both calcium hydroxide and calcium oxide can exist in equilibrium. At any point under the curve, calcium hydroxide would completely decompose into calcium oxide and water. On the other hand, if conditions are maintained at any point above the curve, then calcium oxide would react with water vapor completely and the only solid remaining would be calcium hydroxide. For example, at 950° F., if the partial pressure of water vapor is maintained at 378 mm., then calcium hydroxide would disappear and only calcium oxide would exist. If the partial pressure of water vapor at this temperature is maintained at 396 mm., then calcium oxide would react completely with water vapor forming calcium hydroxide. It is obvious that quicklime can be made to react completely with steam at cracking temperatures by merely regulating the partial pressure of steam so that it exceeds the dissociation pressure of calcium hydroxide.

The curves in Figures II and III indicate the equilibrium dissociation pressures of calcium carbonate. During the regeneration of cracking catalysts the temperature may be about 1200° F. and the concentration of $CO_2$ in the regeneration gas may amount to about 10%. Hence, the partial pressure of $CO_2$ in the regeneration gas would be 76 mm. In Figure II it is shown that the dissociation pressure of calcium carbonate at 1200° F. is 10 mm. Since the partial pressure of $CO_2$ in the regeneration gas exceeds the dissociation pressure of calcium carbonate, calcium oxide will react with the $CO_2$ during the catalyst regeneration step to form calcium carbonate. This would indicate that calcium oxide would not be available for the cracking steps; however, this is not the case for, as the regeneration reaction progresses, the concentration of $CO_2$ in the regeneration gas decreases. Toward the end of the regeneration, the $CO_2$ content of the air is less than 1% and the partial pressure of $CO_2$ is less than 7.6 mm. Since this partial pressure of $CO_2$ is less than the dissociation pressure of calcium carbonate at 1200°

F., the calcium carbonate formed during the catalyst regeneration step would decompose to form quicklime which is required for the cracking step. If $CO_2$ were used in the cracking step to produce the exothermic reaction by formation of calcium carbonate, then this calcium carbonate would be decomposed to quicklime during the final stages of the catalyst regeneration step.

In accordance with my invention, quicklime or other substance capable of developing heat under reaction conditions may either be mixed with the conversion catalyst or deposited on the catalyst. Deposition of the quicklime can be effected in a number of ways. For example, the catalyst can be composited with a suspension of calcium hydroxide in water or with a solution of quicklime in alcohol, and the resulting mixture, after drying, calcined at temperatures of approximately 900° F. or higher to insure that the calcium hydroxide is converted to quicklime. The catalyst in the form of granules, pellets or other discrete particles may be impregnated either in the active state or in the inactive state. If a catalyst is impregnated after it has been used in a conversion cycle and before regeneration, simultaneous dehydration of the lime to the anhydrous state and revivification of the catalyst can be effected. Instead of using a conversion catalyst impregnated with quicklime, a mechanical mixture of the two may be employed. In the latter case, when the conversion catalyst is used in the form of pellets, pills, granules or other fragmentary articles, it is preferable to dilute the calcium oxide with an inert porous refractory material such as Alundum, pumice, kieselguhr, Carborundum and the like by depositing the calcium oxide on such a support. Where the conversion catalyst is used in the powdered form as is the case in fluid type of conversion processes, the calcium oxide may be mixed in the powdered form with the conversion catalyst.

The amount of quicklime or other substance incorporated in the catalyst particles or mixed with the catalyst will depend on conversion conditions such as the endothermicity of the conversion reaction and the length of time during which the catalyst is retained in the conversion zone on the conversion cycle. In oil cracking operations of the conventional catalytic type in which activated natural clay type catalyst or synthetic silica-alumina catalysts are used, approximately 1 to 10% of calcium oxide by weight based on the catalyst is sufficient to maintain the catalytic mass at the required reaction temperature during the conversion cycle by proper regulation of the amount of steam and/or carbon dioxide charged to the catalyst chamber during the conversion cycle. It is to be understood, however, that the invention is not limited to any particular amount of lime, but contemplates use of lime in quantities up to one-half to two times the quantity of conversion catalyst. Where the ratio of lime to catalyst required to sustain a particular reaction temperature is so large as to materially reduce the catalyst activity if the lime were incorporated in or deposited on the catalyst, it is preferable to mechanically mix the lime with the catalyst either in powdered form or deposited on a refractory support depending on whether a powdered or aggregate catalyst is used.

In the static bed or moving bed type of catalytic conversion process, the quicklime may either be deposited on the catalyst or may be deposited on a porous carrier which is intimately mixed with the conversion catalyst. In fluid or suspension type cracking catalysts, the lime is preferably mixed with the powdered catalyst in the form of a fine powder.

It is known that cracking catalysts when in the active state become hydrated by steam and that the hydration is attended by an increase of temperature of approximately 10 to 25° F. However, in cracking reactions this slight rise in temperature due to steam hydration of the catalyst is ineffective to increase the temperature in the reactor because as the cracking reaction progresses the catalyst becomes coated with a carbonaceous deposit and steam hydration ceases to occur; hence a temperature rise is not produced. As a result, at the points in the reactor where temperature increase is most necessary, temperature increase does not take place. When the catalyst enters the reactor it is at the desired temperature and is in the most active state. However, as the catalyst progresses towards the exit, the temperature drops and the catalyst becomes more coked. In order to obtain satisfactory operation in the catalytic reactor, it is necessary, therefore, to provide means for maintaining the catalyst at the desired reaction temperature throughout the entire reactor.

In accordance with my invention the required temperature can be maintained by either control of the amount of quicklime, or other substances which react exothermically, in the different parts of the reactor; or by control of the quantity of steam and/or carbon dioxide fed to the reactor; or by injection of steam and/or carbon dioxide at control points in the reactor; or by any combination thereof. For example, in the static bed cracking type of operation such as in the Houdry process, the amount of lime in the form of a deposit of 20% by weight of lime on silicon carbide granules (bonded with 5 to 25 per cent of porcelain material containing about 8.5 per cent of alkali as potassium and sodium oxides; about 0.75 per cent of iron oxide, titanium oxide, magnesium oxide and calcium oxide; and about 90.75 per cent of aluminum oxide and silicon dioxide) mixed with the catalyst pellets may be so proportioned that it gradually increases from approximately ½% at the inlet to approximately 10% at the exit of the reactor. Hydrocarbon vapors mixed with approximately 30% by weight of steam when charged to the inlet of the reactor wherein the temperature is 810° F. will contain on leaving the reactor approximately 10% steam. As the hydrocarbon and steam mixture progresses through the reactor, the steam hydrates the lime and since more heat is generated as the steam and hydrocarbon vapors pass toward the exit of the chamber, the temperature of the reaction will be maintained at the desired level.

Since the steam and carbon dioxide combine with the quicklime, in order to avoid mixing excessive amounts thereof with hydrocarbon vapors entering the reactor to supply sufficient amounts to react with all the quicklime, steam and/or carbon dioxide may be injected into the reactor at spaced points between the inlet and outlet to thereby insure that the right amount is available to react with the quicklime at the desired points. In this manner steam and/or carbon dioxide can be injected into the reactor at such points as it is found necessary in order to maintain the desired reaction temperature. As previously pointed out, proper proportioning of the quicklime through a static bed reactor may be used in conjunction with regulation of quantity of steam and/or carbon dioxide injection at different points in the reactor in order to effect control of temperature. In the moving bed or fluid catalyst type of reaction, proper control of the temperature can be effected by injecting steam and/or carbon dioxide into the catalyst-lime mixture at spaced points in the reactor in such amounts as it shall be found necessary to maintain the required temperature.

As an example illustrating the process, a synthetic silica-alumina cracking catalyst in the form of pellets is impregnated with 2% by weight of calcium oxide and the catalyst charged at a temperature of approximately 850° F. to the top of a moving bed catalytic cracking reactor. Gas oil vapors super-heated to approximately 850° F. are charged to the bottom of the reactor together with 7.0% by weight of steam. The quantity of steam is regulated so that it is gradually exhausted and insufficient to hydrate the lime in the upper portion of the reactor thereby producing more heat toward the exit of the reactor and maintaining the temperature of the catalyst bed relatively constant throughout the reactor. The quality of the gasoline obtained in substantially the same as that obtained in the same type of operation in which no lime is present. In this example with lime the gasoline conversion is 40%, whereas the gasoline conversion obtained in the same operation without lime and in which no mechanical means are provided for maintaining the temperature of the catalyst bed is 36%. Similar results are obtained under these conditions when a mixture of carbon dioxide and steam or carbon dioxide alone is utilized.

The deactivated catalyst was regenerated with oxygen containing gas at substantially atmospheric pressure and at a temperature of approximately 1100° to 1200° F.

If 12% by weight of carbon dioxide is substituted for steam in the above example and the temperature of the catalyst and oil vapors admitted to the reactor is raised to 950° F., the gasoline conversion is the same as that obtained without lime on the catalyst. The only observable difference between products when using quicklime and when not using quicklime is the greater production of normally gaseous hydrocarbons rich in butylenes in the case in which quicklime is used. Butylenes are especially valuable for making synthetic rubber and aviation gasoline blending agents.

The invention is applicable to conversion processes other than hydrocarbon conversion processes. For example, it is applicable to the dehydration of alcohols over activated alumina catalyst to form ethers and olefins. In this process the activated alumina will have incorporated therewith several percent of calcium oxide. Since water is a product of the dehydration reaction, it will react with the quicklime converting it to calcium hydroxide, with the formation of heat. Additional heating effect can be obtained by introducing carbon dioxide into the catalyst during the reaction in order that the carbon dioxide may react with the calcium hydroxide to form the carbonate, and thereby control the temperature in the catalyst bed at the desired points. By this process ethyl alcohol can be converted into diethyl ether and ethylene.

Alcohols can also be dehydrogenated to aldehydes using my invention.

In addition to preparing catalyst by impregnating the conversion catalyst with the calcium hydroxide in the form of a suspension or solution, the catalyst may be made by soaking conversion catalyst in a solution of calcium salts which readily decompose upon heating to form quicklime, or by soaking an inert refractory support in a solution of such calcium salts. Suitable calcium salts for this purpose are calcium nitrate and calcium acetate. The quantity of calcium salt deposited on this catalyst or support may be regulated by adjusting the concentration of the solution so that on being absorbed by the catalyst or support the desired proportion of calcium compound and catalyst or support is obtained. The impregnated catalyst or support is then dried, after which it is heated to a temperature sufficiently high to decompose the calcium salts to calcium oxide. Where the lime is absorbed on a support other than the catalyst, the impregnated support is subsequently mixed with the catalyst in required amount.

A catalyst suitable for hydrocarbon dehydrogenation, cyclization and aromatization reactions may be prepared by mixing a solution containing the nitrates of aluminum, chromium and calcium with an aqueous ammonia solution containing ammonium carbonate to form a precipitate composed of aluminum hydroxide, chromium hydroxide and calcium carbonate. The precipitate is washed with water to free it of occluded ammonium nitrate and after partial drying is extruded to form rods of about three-eighths inch diameter which may be cut into lengths of about three-eighths of an inch. The extruded particles are further dried and heated at about 1150° F. in a current of air to decompose the calcium carbonate present in the catalyst to quicklime. The catalyst prepared as just described is suitable for use in static or moving bed catalytic processes.

If the catalyst is to be used in a fluid type operation the washed precipitate is not pelleted, but is dried and heated at approximately 1150° F. in order to decompose the calcium carbonate to quicklime. The calcined catalyst is then ground to a powder of the desired degree of fineness.

A catalyst prepared as just described and containing approximately 3% of calcium oxide, 27% chromium sesquioxide and 70% of aluminum oxide, is particularly effective as a dehydrogenation, cyclization and aromatization catalyst.

A suitable cracking catalyst may be prepared by mixing equal volumes of sulfuric acid solution having a specific gravity of about 1.189 with a sodium silicate solution having a specific gravity of about 1.208 to form a hydrosol which on standing several hours sets to a hydrogel. The silica hydrogel is broken into particles of about one inch in diameter, washed free of sodium sulfate with water and then soaked over night in a solution containing 300 grams of aluminum nitrate $(Al(NO_3)_3.9H_2O)$ and 23 grams of calcium nitrate $(Ca(NO_3)_2.4H_2O)$ per liter of solution. Sufficient solution is used to completely cover the catalyst. The impregnated silica hydrogel is separated from the solution and dried to a constant weight at about 200° F., after which it is gradually heated to 1100° F. in order to decompose the nitrates of aluminum and calcium to the corresponding oxides, and to activate the catalyst. The resulting catalyst will be in the form of hard glassy fragments resembling silica gel and have an approximate weight composition (on a dry basis) of 83% silica, 15% alumina and 2% lime.

Catalysts for the dehydrogenation of alcohols to aldehydes, as for example methyl alcohol to formaldehyde, or ethyl alcohol to acetaldehyde, may be prepared by co-precipitation of aluminum hydroxide, calcium carbonate and hydrated oxides of iron, chromium, tin or zinc, by means of an aqueous solution of ammonia and ammonium carbonate followed by drying of the precipitate and heating to about 1150° F. to decompose the carbonate to the oxide.

Another method of preparing a catalyst suitable for dehydrogenation of alcohols to aldehydes is by soaking activated alumina or alumina gel in a solution of calcium nitrate and a nitrate of a suitable metal such as iron, chromium, tin or zinc. The resulting alumina containing the absorbed nitrates is dried and heated to approximately 950° F. to decompose the nitrates to the oxides. A catalyst having a weight composition of approximately 75% of alumina, 20% of ferric oxide and 5% of lime is satisfactory for dehydrogenation of alcohols to aldehydes.

Thus it will be seen that I have discovered a novel method for maintaining desired reaction temperature of endothermic catalytic reactions by incorporating with the catalyst a substance which does not interfere to any material extent with the conversion reaction, and which is capable of reacting with a fluid introduced into contact therewith during the conversion reaction and which does not interfere with the desired conversion. The substance is exothermally converted during the conversion reaction to a form which is readily regenerated to its original form during regeneration of the catalyst by heating to elevated temperatures in an atmosphere having a partial pressure with respect to the gaseous dissociation products to be split from said substance sufficiently low to allow said products to split off and regenerate said substance.

It is claimed:

1. The method of catalytically cracking hydrocarbon oil in the presence of a solid catalyst regeneratable by heating in presence of oxygen comprising incorporating quicklime in the catalyst and contacting the quicklime with carbon dioxide during the cracking reaction.

2. The method of carrying out an endothermic catalytic reaction comprising contacting the reactants with a solid catalyst in the presence of a substantial amount of quicklime and a mixture of steam and carbon dioxide under such conditions that the partial pressures of the steam and carbon dioxide exceed the dissociation pressures of calcium hydroxide and calcium carbonate at reaction temperature, whereby the steam and carbon dioxide react exothermally with said quicklime during the reaction.

3. The method of cracking hydrocarbons to lower boiling hydrocarbons comprising contacting said hydrocarbons under suitable cracking conditions of time, temperature and pressure with a silica-alumina cracking catalyst containing a small amount of calcium oxide, and charging sufficient gas selected from the group consisting of steam and carbon dioxide to the reaction zone to maintain the partial pressure of said steam or carbon dioxide above the dissociation pressure of calcium hydroxide or calcium carbonate in said reaction zone, whereby the steam or carbon dioxide reacts exothermally with said calcium oxide during the cracking reaction.

4. The method of maintaining a solid comminuted catalyst at reaction temperature in the catalytic cracking of hydrocarbon oil comprising, mixing quicklime with the catalyst and contacting said quicklime with steam during the cracking reaction, the amount of steam in the reaction zone being maintained so that its partial pressure exceeds the dissociation pressure of calcium hydroxide at reaction temperature.

5. The method in accordance with claim 4 in which a mixture of deactivated catalyst and hydrated lime is periodically regenerated by heating to a temperature in excess of approximately 1050° F. in the presence of oxygen-containing gas.

6. The method of maintaining a solid comminuted catalyst at reaction temperature in the endothermic conversion of organic substances comprising contacting said substances with said catalyst in which is incorporated calcium oxide and charging sufficient gas from the group consisting of steam and carbon dioxide to the reaction zone to maintain the partial pressure of said steam or carbon dioxide above the dissociation pressure of calcium hydroxide or calcium carbonate in said reaction zone, whereby the steam or carbon dioxide reacts exothermally with said calcium oxide during said conversion.

7. Method in accordance with claim 6 in which the catalyst is maintained as a stationary bed in the reaction zone and the amount of calcium oxide incorporated in the catalyst increases from the inlet to the outlet of the reaction zone.

8. Method in accordance with claim 6 in which the catalyst alternately goes through a reaction cycle and a regeneration cycle in which latter cycle it is regenerated by means of an oxygen-containing gas at a temperature of about 1100°–1200° F.

9. The method in accordance with claim 6 in which the catalyst is impregnated with calcium oxide.

10. The method in accordance with claim 6 in which the catalyst is mechanically mixed with calcium oxide.

11. The method in accordance with claim 6 in which the gas is steam and the steam is charged to the reaction zone at a plurality of spaced points in quantities materially exceeding those necessary to maintain the partial pressure of water vapor in the reaction zone equal to the dissociation pressure of quicklime, whereby the desired reaction temperature is maintained throughout the reaction zone by the heat of hydration of the quicklime.

MILTON M. MARISIC.

REFERENCES CITED

The following references are of record in the file of this patent:

UNITED STATES PATENTS

| Number | Name | Date |
|---|---|---|
| 1,111,580 | Herber | Sept. 22, 1914 |
| 1,271,013 | Bosch et al. | July 2, 1918 |
| 1,711,855 | Prudhomme | May 7, 1929 |
| 1,926,587 | Hansgirg | Sept. 12, 1933 |
| 2,110,833 | Mark | Mar. 8, 1938 |
| 2,129,649 | Cross, Jr., et al. | Sept. 13, 1938 |
| 2,244,612 | Crowley | June 3, 1941 |
| 2,283,173 | Bates | May 19, 1942 |
| 2,288,873 | d'Ouville | July 7, 1942 |
| 2,288,874 | Anderson et al. | July 7, 1942 |
| 2,311,979 | Corson | Feb. 23, 1943 |
| 2,369,106 | Heckel et al. | Feb. 6, 1945 |
| 2,395,931 | La Lande, Jr. | Mar. 5, 1946 |